United States Patent
Lewis

[11] 3,804,550
[45] Apr. 16, 1974

[54] CONTROL VANE ARRANGEMENT FOR GAS TURBINE

[75] Inventor: Geoffrey Arthur Lewis, Solihull, England

[73] Assignee: Lucas Aerospace Limited, Birmingham, England

[22] Filed: Jan. 12, 1973

[21] Appl. No.: 323,237

[30] Foreign Application Priority Data
Jan. 12, 1972 Great Britain................... 1406/72

[52] U.S. Cl.................. 415/147, 415/160, 415/151
[51] Int. Cl....................... F04d 29/56, F04d 15/00
[58] Field of Search .......... 415/147, 149, 152, 153, 415/154, 155, 160, 161, 162, 163

[56] References Cited
UNITED STATES PATENTS
3,719,427  3/1973  Davis................................. 415/147
3,682,570  8/1972  Kaplansky et al. .................. 415/147
3,025,036  3/1962  Kumm et al. ....................... 415/149

FOREIGN PATENTS OR APPLICATIONS
380,701  9/1932  Great Britain..................... 415/163

Primary Examiner—Henry F. Raduazo
Attorney, Agent, or Firm—Holman & Stern

[57] ABSTRACT

A control vane arrangement for a turbine has an even number of vanes past which gas flows from the turbine inlet to the rotor. Alternate ones of the vanes are movable in either direction from positions in which they are transverse to the rotor axis and the remainder of the vanes are movable in either direction from positions in which they are parallel to the rotor axis. Movement is simultaneous; and in the aforesaid transverse and parallel positions, gas flow to the rotor is effectively shut off. The vanes pass through the shut-off positions as they are moved to reverse the direction of the rotor.

5 Claims, 4 Drawing Figures

PATENTED APR 16 1974  3,804,550

CONTROL VANE ARRANGEMENT FOR GAS TURBINE

This invention relates to a control vane arrangement for a turbine.

According to the invention a control vane arrangement for a turbine comprises a first chamber surrounding a rotor of the turbine, a second chamber communicating with an inlet for the turbine, an even number of vanes pivotally mounted between the first and second chambers past which vanes a fluid flows, in use from the inlet to the rotor, means for pivotally moving alternate ones of said vanes in either direction from positions in which they are transverse to the rotor axis, means for pivotally moving the others of said vanes in either direction from positions in which they are substantially parallel to the rotor axis, angular movement of said alternate vanes in one direction being accompanied by angular movement of said other vanes in the opposite direction, and the arrangement being such that when said alternate vanes are in said transverse positions, said other vanes are in said parallel positions.

An example of the invention will now be described with reference to the accompanying drawings, in which.

Figure 1:
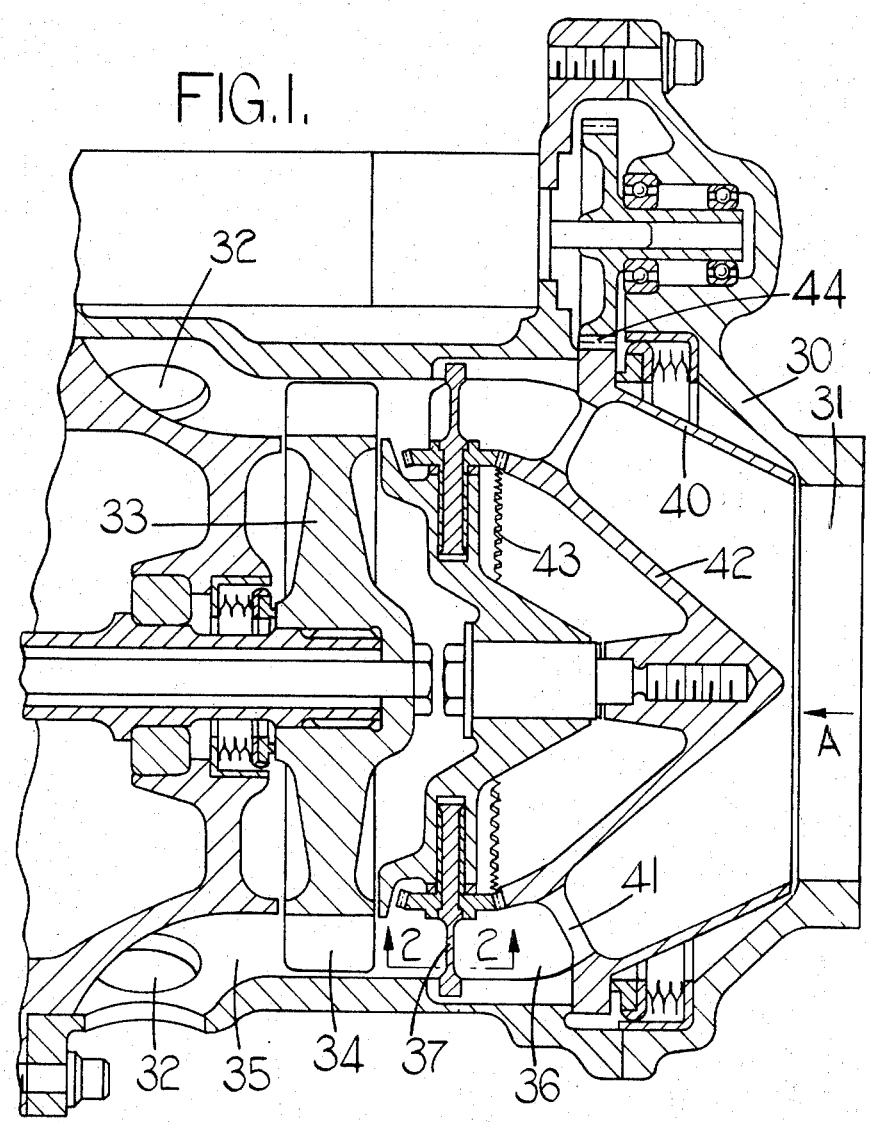
FIG. 1 is a section through a gas turbine.

A turbine has a housing 30 with a gas inlet 31 and a plurality of outlets 32. Journalled in the housing 30 is a rotor 33 having a plurality of axial flow blades 34. A chamber 35 surrounds the rotor 33 and communicates with outlets 32. A further chamber 36 communicates with inlet 31.

Pivotally mounted in housing 30 between chambers 35, 36 are an even number of vanes 37. Coupled to alternate ones 37a of vanes 37 are pinions 38. Coupled to the remaining ones 37b of vanes 37 are pinions 39 which have a smaller pitch circle diameter than pinions 38. The ratio of the pitch circle diameters is such that a 40° rotation of pinions 38 results in a 140° rotation of pinions 39. Each of the pinions 38, 39 meshes with the two pinions on either side of it.

Sealingly rotatable in housing 30 is a frusto-conical part 40. Supported within part 40 by webs 41 is a conical baffle 42 whose apex is directed towards inlet 31 and which is formed with gear teeth 43 which mesh with pinions 38. Part 40 includes an external ring gear 44 which meshes with a pinion 45 driven by an electric motor 46.

Figures 3, 4:
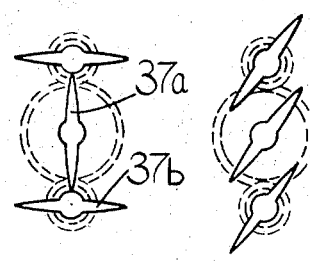
FIG. 3 and 4 show alternative positions of the parts shown in FIG. 2.

Pinions 38, 39 are interengaged so that there is a position of vanes 37 as shown in FIG. 3, in which vanes 37a are transverse to the axis of the rotor 33 and thus also transverse to the direction of gas flow from the inlet 31 to the rotor 33 and vanes 37b are substantially parallel to the rotor axis and thus substantially aligned with the direction of gas flow. In this position gas flow to the rotor 33 is effectively shut off.

Figure 2:
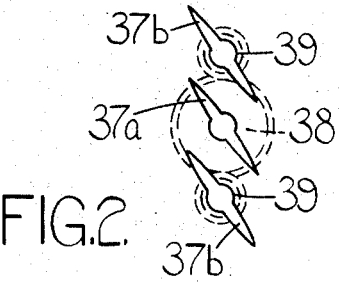
FIG. 2 is a scrap view on line 2—2 in FIG. 1.

In use the vanes 37 are simultaneously movable from the positions shown in FIG. 3 to the positions shown in FIG. 2, in which positions a gas flow causes rotor 33 to move clockwise, as viewed on arrow A. During this movement the amount of gas flow is progressively increased. Vanes 37 are similarly movable in the opposite directions from the positions shown in FIG. 3 to the positions shown in FIG. 4, causing the rotor 33 to move anticlockwise. The vane arrangement thus causes gas flow to be reduced to a minimum value before a reverse impulse is applied to the turbine.

I claim:

1. A control vane arrangement for a turbine, comprising a first chamber surrounding a rotor of the turbine, a second chamber communicating with an inlet for the turbine, an even number of vanes pivotally mounted between the first and second chambers, past which vanes a fluid flows, in use from the inlet to the rotor means for pivotally moving alternate ones of said vanes in either direction from positions in which they are transverse to the rotor axis, means for pivotally moving the others of said vanes in either direction from positions in which they are substantially parallel to the rotor axis, angular movement of said alternate vanes by said first means in one direction being accompanied by angular movement of the means of said other vanes in the opposite direction, and the arrangement being such that when said alternate vanes are in said transverse positions, said other vanes are in said parallel positions.

2. An arrangement as claimed in claim 1 in which the means for moving said alternate vanes comprises first toothed gear elements secured to said alternate vanes, and the means for moving said other vanes comprises second toothed gear elements secured to said other vanes, each first gear element meshing with a second gear element and the pitch circle diameter of said first gear elements being greater than that of said second gear elements.

3. An arrangement as claimed in claim 2 in which each first gear element meshes with two of said second gear elements, and each second gear element meshes with two of said first gear elements.

4. An arrangement as claimed in claim 3 which includes a third gear element meshing with selected ones of said gear elements meshing with selected ones of said gear elements, said third gear element being rotatable between a first position in which said vanes are inclined in one direction with respect to the turbine axis and a second position in which said vanes are inclined in the opposite direction to said turbine axis.

5. An arrangement as claimed in claim 4 in which said third gear element is rotatable about an axis which is axially aligned with said rotor axis.

* * * * *